US006932061B2

(12) United States Patent
Tsuruta

(10) Patent No.: US 6,932,061 B2
(45) Date of Patent: Aug. 23, 2005

(54) FUEL ROUTING APPARATUS FOR A VEHICULAR FUEL TANK, AND FUEL TANK INCORPORATING SAME

(75) Inventor: Yuichiro Tsuruta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/894,398

(22) Filed: Jul. 19, 2004

(65) Prior Publication Data

US 2005/0045233 A1 Mar. 3, 2005

(30) Foreign Application Priority Data

Aug. 29, 2003 (JP) ......................................... 2003-307016

(51) Int. Cl.[7] .............................................. B62J 35/00
(52) U.S. Cl. ........................ 123/514; 123/468; 123/469; 137/565.17
(58) Field of Search ................................ 123/468, 469, 123/510, 514; 137/565.17

(56) References Cited

U.S. PATENT DOCUMENTS

| 4,694,857 | A |   | 9/1987  | Harris           |
|-----------|---|---|---------|------------------|
| 4,722,708 | A | * | 2/1988  | Baltz ............... 440/88 R |
| 5,056,492 | A |   | 10/1991 | Banse            |
| 5,431,143 | A |   | 7/1995  | Brown            |
| 5,613,476 | A |   | 3/1997  | Oi et al.        |
| 5,762,048 | A | * | 6/1998  | Yonekawa ........... 123/514 |
| 5,873,348 | A | * | 2/1999  | Fuchs et al. ........ 123/514 |
| 6,161,562 | A |   | 12/2000 | Keefer et al.    |
| 6,161,574 | A | * | 12/2000 | Gerhard et al. ..... 137/510 |
| 6,273,118 | B1 |   | 8/2001 | Watson           |
| 6,273,123 | B1 |   | 8/2001 | Keefer et al.    |
| 6,810,908 | B2 | * | 11/2004 | Eck et al. ....... 137/565.22 |

FOREIGN PATENT DOCUMENTS

| JP | 54-97626 |   | 7/1979 |
|----|----------|---|--------|
| JP | 56-143185 |  | 10/1981 |
| JP | 58-119960 | * | 7/1983 |

* cited by examiner

Primary Examiner—Weilun Lo
(74) Attorney, Agent, or Firm—Carrier, Blackman & Associates, P.C.; Joseph P. Carrier; William D. Blackman

(57) ABSTRACT

A fuel tank includes fuel pipes which are configured to resist bubble disruption of the fuel pump, minimizing the risk of fuel running out when the tank level becomes low. The fuel tank includes a fuel tank body with a fuel feed conduit operatively attached thereto, for feeding fuel to a fuel injection system. The fuel feed conduit has a pickup inlet which opens into the fuel tank body, allowing fuel to be drawn outwardly by a fuel pump of the fuel injection system. The fuel tank also includes a fuel return conduit with a return port inside the fuel tank body, for returning unused fuel therethrough to the fuel tank body. The return port of the fuel return conduit is directed toward the pickup inlet of the fuel feed conduit. The fuel feed and return conduits may be fixed to the fuel tank body using a plate-shaped member.

18 Claims, 4 Drawing Sheets

FUEL ROUTING APPARATUS FOR A VEHICULAR FUEL TANK, AND FUEL TANK INCORPORATING SAME

CROSS-REFERENCE TO RELATED APPLICATIONS

The present invention claims priority under 35 USC 119 based on Japanese patent application No. 2003-307016, filed Aug. 29, 2003.

1. Field of the Invention

The present invention relates to fuel tanks and related hardware for vehicle use. More specifically, the present invention relates to a fuel routing apparatus for a fuel tank, and to a fuel tank which enables improved fuel management using the improved fuel routing apparatus.

2. Description of the Background Art

Many different types of fuel tanks are known for vehicles. A vehicular fuel tank is known which includes a fuel tank body, with a fuel feed pipe having an inlet opening into the fuel tank body for supplying fuel to a fuel injection system. A fuel tank of this known type also includes a fuel return pipe, operatively attached to the fuel tank body, for returning unused fuel from the fuel injection system back into the fuel tank body. The fuel return pipe includes a return port, disposed inside of the fuel tank, for releasing fuel back into the tank.

There is a fuel tank of this known type in which the fuel feed pipe and the fuel return pipe are disposed side by side on the bottom part of the fuel tank body, and both inlet of the fuel feed pipe and return port of the fuel return pipe are arranged extending upwardly.

For example, Japanese Utility Model Application Laid-open Patent No. 56-143185 and Japanese Utility Model Application Laid-open Patent No. 54-97626 each disclose a fuel tank of this type.

Regarding the examples cited above, in the conventional structure in which the fuel feed pipe and the fuel return conduit are disposed side by side on the bottom part of the fuel tank body, and both the pickup inlet of the fuel feed conduit and the return port of the fuel return conduit are arranged extending upwardly, the two passages are arranged side by side, but no particular consideration is given for efficient feeding of the returned fuel.

SUMMARY OF THE INVENTION

Therefore, it is an object of the present invention to provide a fuel routing apparatus and fuel tank which promotes efficient circulation of returned fuel from the return pipe to the feed pipe.

It is another object of the present invention to provide a fuel routing apparatus and fuel tank which helps to resist fuel pump bubble disruption.

It is still another object of the present invention to provide a fuel routing apparatus and fuel tank designed to minimize the likelihood of the engine running out of fuel.

In order to achieve the objects stated above, a first aspect of the present invention provides a fuel tank with a fuel tank body and a fuel feed pipe operatively attached to the fuel tank body, the fuel feed pipe having a pickup inlet opening into the fuel tank body. The feed pipe allows fuel to flow outwardly from the tank body to a fuel pump of a fuel injection system.

The fuel tank and routing apparatus according to the first aspect hereof also includes a fuel return pipe operatively attached to the tank body, for recycling unused fuel from the fuel injection system back into the fuel tank body. The fuel return pipe includes a return port, located inside the fuel tank body, for expelling the recycled fuel. The fuel tank and routing apparatus according to the present invention is characterized in that the return port of the fuel return conduit is oriented facing toward the pickup inlet of the fuel feed conduit.

The invention as it pertains to a second aspect hereof is characterized in that, in the invention as described above, the fuel feed conduit and the fuel return conduit are disposed in the bottom part of the fuel tank body, and the fuel return conduit, after rising from the bottom part, bends convexly upward, with the return port directed toward the pickup inlet of the feed pipe.

The invention as it pertains to a third aspect hereof is characterized in the fuel feed conduit and the fuel return conduit are disposed on a common plate-shaped member, and are fitted to the fuel tank body via the plate-shaped member.

The invention as it pertains to a fourth aspect hereof is characterized in that, in the invention as described above, the pickup inlet of the fuel feed conduit is provided with a filter thereon.

The invention as it pertains to a fifth aspect hereof is characterized in that, in the invention as described above, the fuel tank is adapted to be installed on a saddle-riding type four-wheeled vehicle.

According to the first aspect of the invention, since the return port of the fuel return conduit is oriented facing toward the pickup inlet of the fuel feed conduit, when there is only a little fuel remaining in the fuel tank body, fuel returned from the fuel injection system into the fuel tank body, via the fuel return pipe, is discharged from the return port of the fuel return pipe toward the pickup inlet of the fuel feed conduit.

Therefore, the fuel returned from the fuel injection system into the fuel tank body via the fuel return conduit is quickly and effectively accepted through the pickup inlet, and fed to the fuel pump via the fuel feed conduit. Accordingly, the risk of the fuel pump experiencing bubble disruption and running out of fuel, which would occur when the quantity of fuel remaining in the fuel tank body has become small, can be minimized. Moreover, as these features can be realized with a simple structure, there are advantages in weight and cost aspects.

DETAILED DESCRIPTION OF THE INVENTION

It should be understood that only structures considered necessary for clarifying the present invention are described herein. Other conventional structures, and those of auxiliary components of the system, are assumed to be known and understood by those in the art.

A fuel tank and fuel routing apparatus according to a number of selected illustrative embodiments of the present invention will be described below, with reference to the drawings. It should be noted that the left and right and the forward and backward directions, respectively, as referred to in the following description, refer to these directions as considered from the vantage point of a driver seated in the vehicle and facing forwardly.

Figure 1:
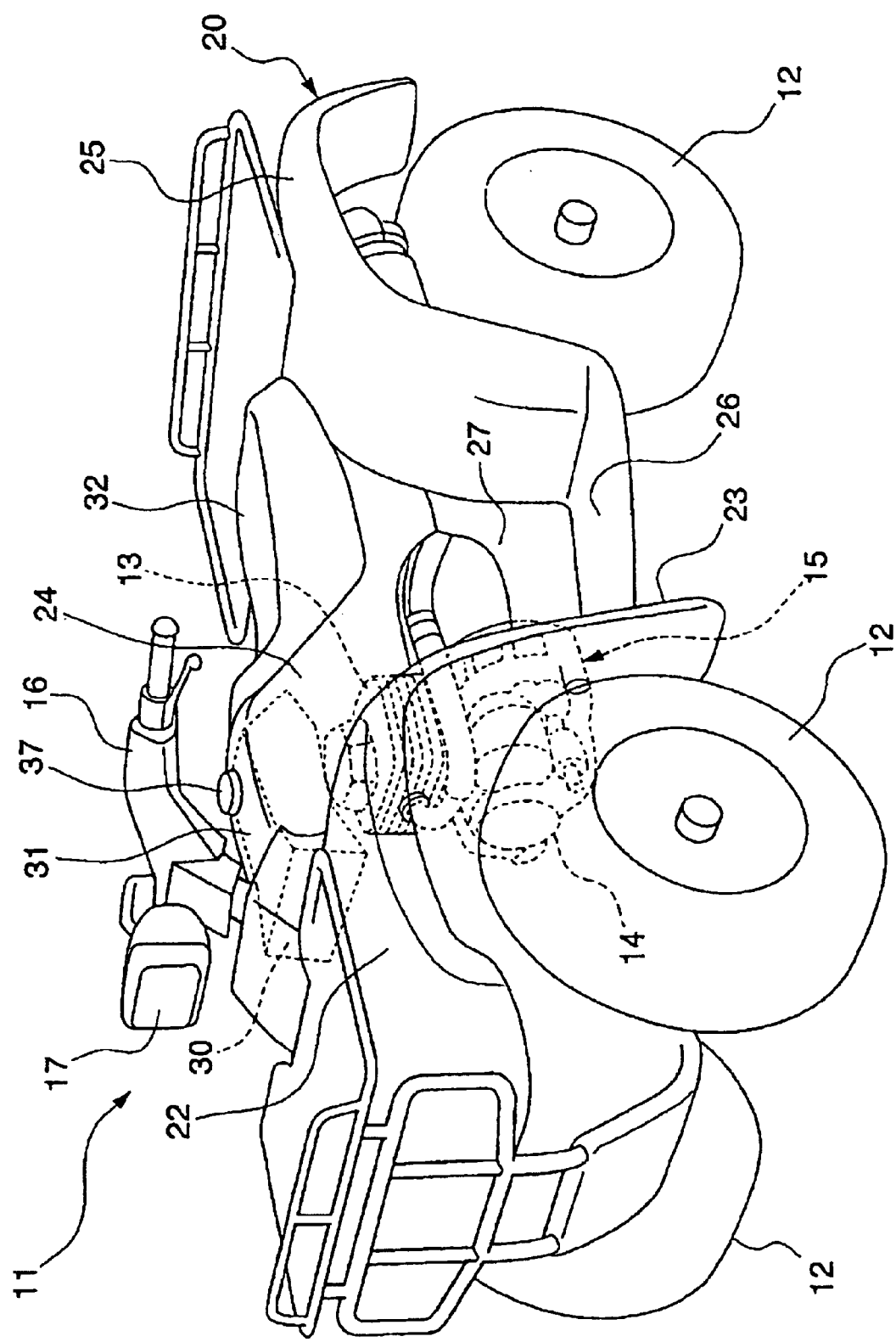
FIG. 1 is a perspective view of an all-terrain vehicle incorporating a fuel tank and fuel routing apparatus according to an illustrative embodiment of the present invention.

FIG. 1 shows a perspective view of a vehicle 11 incorporating a fuel tank and fuel routing apparatus according to a selected illustrative embodiment of the present invention. The vehicle 11 is a saddle-riding type of four-wheeled all-terrain vehicle (ATV) which is capable of operating off-road on irregular ground.

This saddle-riding type vehicle 11 has four wheels 12, arranged at the four corners of the vehicle body. The vehicle 11 is also provided with a powertrain 15 including an engine 13 and a transmission 14 arranged in a substantially central position of the vehicle body, and a steering bar 16 for steering the front wheels. The steering bar 16 extends in the left-and-right direction at the upper front part of the vehicle body, as shown.

The vehicle 11 also includes a head lamp unit 17 supported by the steering bar 16, and a body cover 20, constituting the outer shell of the vehicle body. In addition, this saddle-riding type vehicle 11 may have a so-called longitudinal crankshaft (not shown), extending in the back-and-forth direction, for the engine 13.

The body cover 20 includes a front cover 22 shielding the front part of the vehicle body including the front wheels 12, left and right sub-fenders 23 disposed behind the front cover 22 and shielding the rear part of the front wheels 12, and a center cover 24 disposed behind the front cover 22 and shielding the upper part of the vehicle body.

The body cover 20 also includes a rear cover 25 disposed behind the center cover 24 and shielding the rear part of the vehicle body, left and right mud guards 26 disposed behind the sub-fenders 23 and shielding the flanks of the vehicle body, and left and right engine sub-covers 27 disposed between the rear end side of the center cover 24 and the mud guards 26 and shielding the flanks of the vehicle body.

The front part of the center cover 24, in the middle in the direction of the body width, serves as a fuel tank covering portion 31 for shielding a fuel tank 30, and a seat 32 is centrally provided on the rear part of the center cover 24.

As noted above, in the depicted embodiment, the fuel tank 30 is disposed underneath the fuel tank covering portion 31 of the center cover 24.

Figure 2:
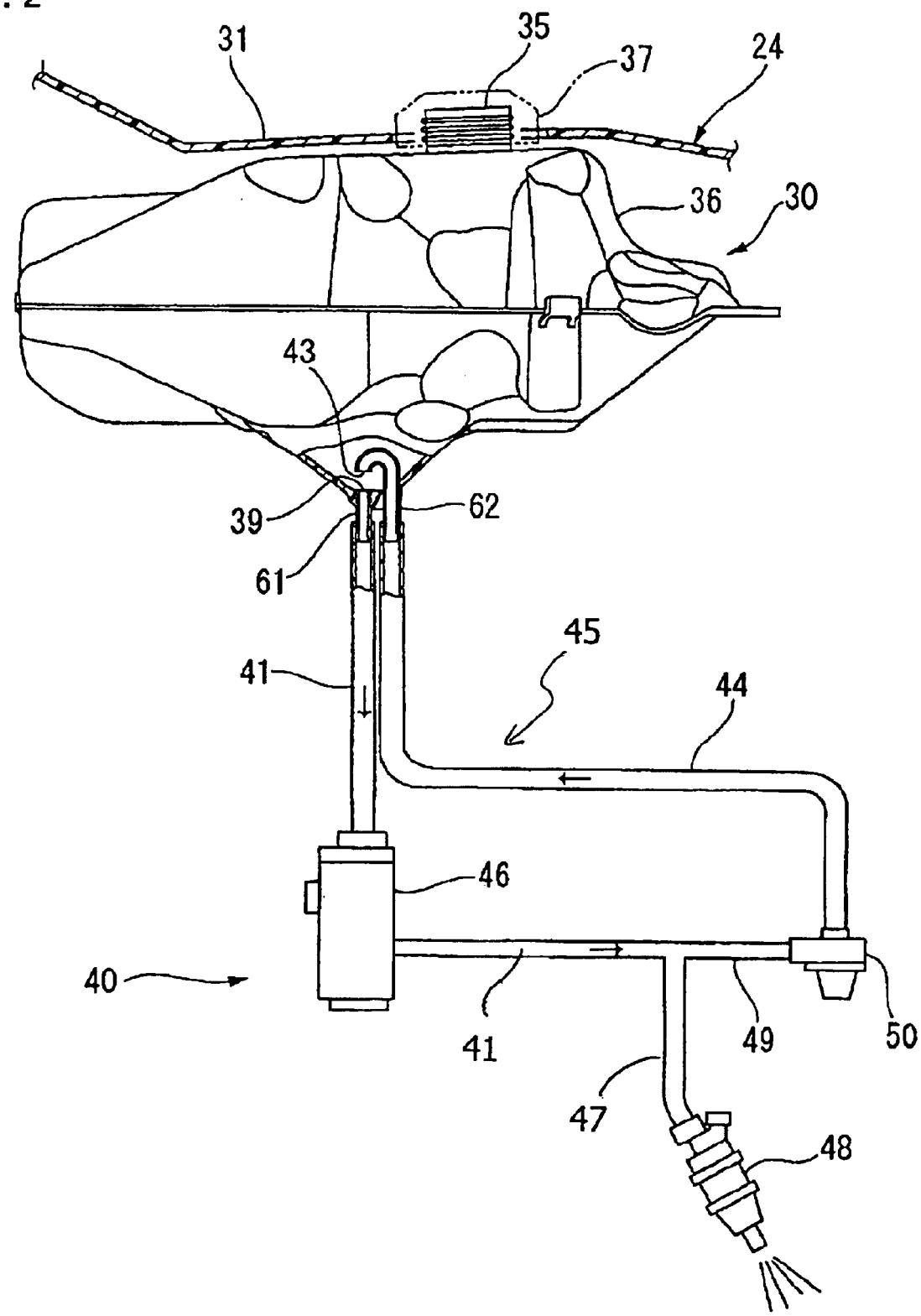
FIG. 2 is a schematic diagram of the fuel tank and a fuel injection system according to a first illustrative embodiment of the present invention.

As shown in FIG. 2, the fuel tank 30 in this embodiment is provided with a fuel tank body 36 having a filler neck 35 formed integrally thereon and protruding upwardly through an opening provided in the fuel tank covering portion 31. Fuel supplied through this filler neck 35 is stored in the tank body 36. The filler neck 35 is covered by a tank cap 37 when not in use, and the tank cap 37 is provided for opening and closing the fuel filler neck 35.

The fuel tank 30 is also provided with a fuel system feed line 41 in fluid communication with a fuel feed pipe 61, which extends through a lower wall of the tank body 36. The fuel feed pipe 61 is a hollow, tubular conduit and has a pickup inlet 39 formed in an upper end thereof, opening into the fuel tank body 36.

The vehicle 11 is also provided with a fuel pump 46 which draws fuel inwardly through the pickup inlet 39 of the fuel feed pipe 61, and supplies it to other parts of a fuel injection system 40, to be described subsequently.

The fuel tank 30 is also provided with a fuel return line 44 in fluid communication with a fuel return pipe 62 attached to the upper end thereof. The fuel return pipe 62 extends through a lower wall of the tank body 36, and terminates to form a return port 43 opening inside the fuel tank body 36. The fuel return line 44 returns recycled fuel from the fuel injection system 40 back into the fuel tank body 36, through the return port 43.

The fuel injection system 40 according to the illustrated embodiment is an electronically controlled fuel injection system, which provides a fuel flow circuit 45 for continuously circulating fuel therethrough while the vehicle's ignition is on. The fuel pump 46 is disposed midway on the fuel feed line 41, and the fuel pump 46 draws fuel from the fuel tank body 36 via the fuel feed line 41, and pressure-feeds the drawn fuel further along the fuel feed line 41.

The fuel injection system 40 also includes an injector feed line 47 which branches off of the main fuel feed line 41, and an electronically-controlled fuel injection valve, also referred to as a fuel injector 48. The fuel injector 48 injects fuel, which has been pressure-fed by the fuel pump 46 via the fuel feed lines 41 and 47, into an intake manifold (not shown) of the engine 13, and this fuel is burned to power the engine 14.

The fuel flow circuit 45 of the fuel injection system 40 also includes a return branch passage 49 which extends from the main fuel feed line 41 and branches off of the injector feed line 47 downstream of the fuel pump 46. The fuel injection system 40 also includes a fuel pressure regulating valve 50 disposed in-line on this return branch passage 49. The aforementioned fuel return line 44 is connected to the fuel pressure regulating valve 50 on the downstream side. Accordingly, it will be understood that unused fuel from the fuel feed line 41, which is not expelled through the fuel injector 48 or retained in the fuel line, is routed back to the fuel tank body 36 through the return line 44, via the fuel pressure regulating valve 50.

Figure 3:
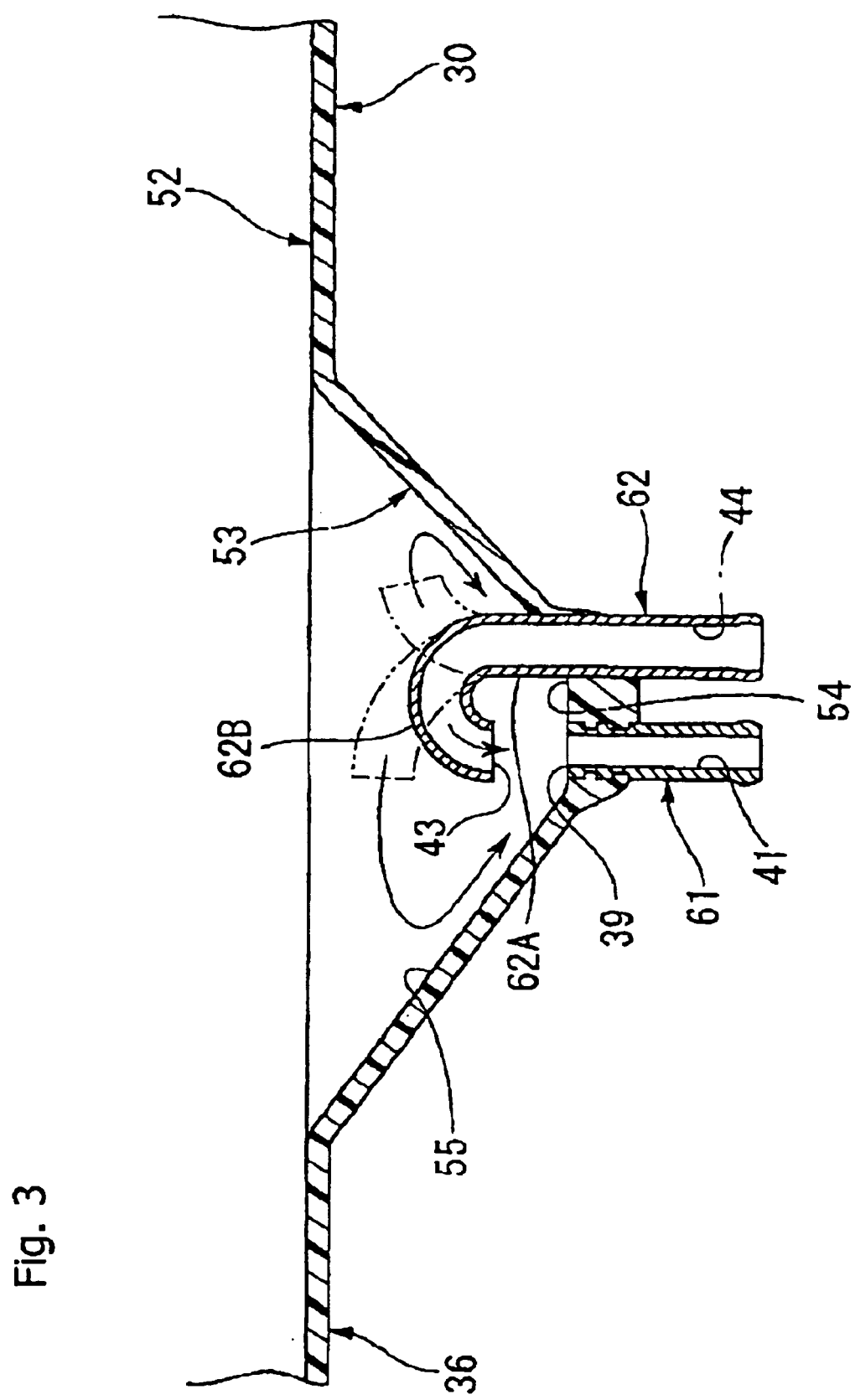
FIG. 3 is a partially enlarged sectional view of a portion of the fuel tank of FIG. 2, according to the first illustrative embodiment of the invention.

As shown in FIGS. 2–3, in a first embodiment of the invention, a concave bowl portion 53, having a central region depressed to a lower level than its circumference, is formed substantially centrally in the bottom part 52 of the fuel tank body 36. This concave bowl portion 53 has a substantially tapered shape resembling a truncated cone, with its bottom part 54 arranged substantially horizontally, and with its wall face 55 inclined at an angle relative to the bottom part, and positioned facing more inward in the horizontal direction in the lower portion. It will be understood that other shapes may be used for the bowl portion 53 besides that shown, as long as the bowl portion forms a reservoir disposed below the remainder of the fuel tank body 36.

In this first embodiment, the fuel feed pipe 61 and the fuel return pipe 62 extend, in a fluid-sealed manner, through apertures formed in the bottom part 54 of the concave bowl portion 53 in the bottom part 52 of the fuel tank body 36. The fuel feed pipe 61 has a terminal fuel feed passage 41 defined therein to permit fuel flow therethrough, and the fuel return pipe 62 has a terminal fuel return passage 44 defined therein to permit fuel flow therethrough.

The upper tip end of the fuel feed pipe 61 is embedded in the bottom part 54 of the concave bowl portion 53, and the pickup inlet 39 disposed at the upper tip end is directed perpendicularly upwardly toward the tank body 30, so as to be aligned with the upper face of the bottom part 54.

On the other hand, the fuel return pipe 62 passes through the bottom part 54 of the concave bowl portion 53, with the tip end thereof disposed inside of the fuel tank body 36. In the embodiment of FIGS. 2–3, the fuel return pipe 62 is formed in an inverted J-shape, including a linear portion 62A rising perpendicularly in a linear configuration from the bottom part 54 of the concave bowl portion 53. The fuel return pipe 62 also has a curved portion 62B, with the upper surface thereof bending convexly upwardly from the upper end of the linear portion 62A in a semi-circular form so as to position the return port 43, at the outlet end thereof, over the fuel feed pipe 61.

The fuel return pipe 62 is configured and arranged to direct the return port 43, disposed at the terminal end of the curved portion 62B, substantially perpendicularly downwardly and toward the pickup inlet of the fuel feed pipe 61.

The pickup inlet 39 of the fuel feed pipe 61 is situated directly beneath and spaced apart from the return port 43 of the fuel return pipe 62. This means that fuel flowing outwardly from the return port 43 will be directed towards the pickup inlet 39 of the fuel feed pipe.

Specifically, the pickup inlet 39, whose diameter is smaller than that of the return port 43, is positioned below, and arranged horizontally within a vertical extension of the diameter of the return port 43, such that the inlet 39 and the vertical extension of the return port 43 are generally concentric and coaxial, and the vertical extension of the return port 43 overlaps the pickup inlet 39 in the horizontal direction.

In other words, the outlet of the fuel return line 44, namely the return port 43 of the fuel return pipe 62, is directed toward the fuel feed pipe 61, namely the pickup inlet 39 of the fuel feed line 41. The return port 43 and the pickup inlet 39 here are arranged in the hollow space within the concave bowl portion 53 in both the horizontal direction and the vertical direction.

In the embodiment so far described, as the return port 43 of the fuel return line 44 is directed toward the pickup inlet 39 of the fuel feed line 41, fuel returned through the flow circuit 45 from the fuel pressure regulating valve 50 of the fuel injection system 40 to the fuel tank body 36 via the fuel return line 44 is discharged from the return port 43 of the fuel return line 44 toward the pickup inlet 39 of the fuel feed line 41.

Therefore, when the quantity of fuel in the fuel tank body 36 has become small, fuel returned from the fuel pressure regulating valve 50 of the fuel injection system 40 into the fuel tank body 36, via the fuel return line 44, is rapidly and effectively drawn into the pickup inlet 39 and fed to the fuel pump 46 of the fuel injection system 40, via the fuel feed line 41.

As a result of the above-described arrangement of parts, bubble disruption of the fuel pump 46, which could otherwise occur when the quantity of fuel in the fuel tank body 36 has become small, can be resisted, and the risk of fuel running out can be minimized. Moreover, as these features can be realized in a simple structure, there are advantages in weight and cost aspects.

Also, it is sufficient for the return port 43 only to be directed in a non-vertical stream toward the vicinity of the pickup inlet 39, and variations are permitted in the curvature of the fuel return pipe 62B, within the range of being directed toward the wall face 55 of the concave bowl portion 53 (see alternative phantom outlines shown in FIG. 3). As the bend of the return port 43 need not be great in that case, manufacturing and assembly are facilitated.

In addition, although the return port 43 of the fuel return line 44 is situated vertically opposite the pickup inlet 39 of the fuel feed line 41 in the specific example of the embodiment described above, their relative positions may be shifted in the horizontal direction if the return port 43 is moved closer to the pickup inlet 39. However, the advantage noted above can be greater if the return port 43 is located vertically opposite and aligned with the pickup inlet 39.

Further, it is possible to modify the above-described mode of implementation in the following way.

Figure 4:
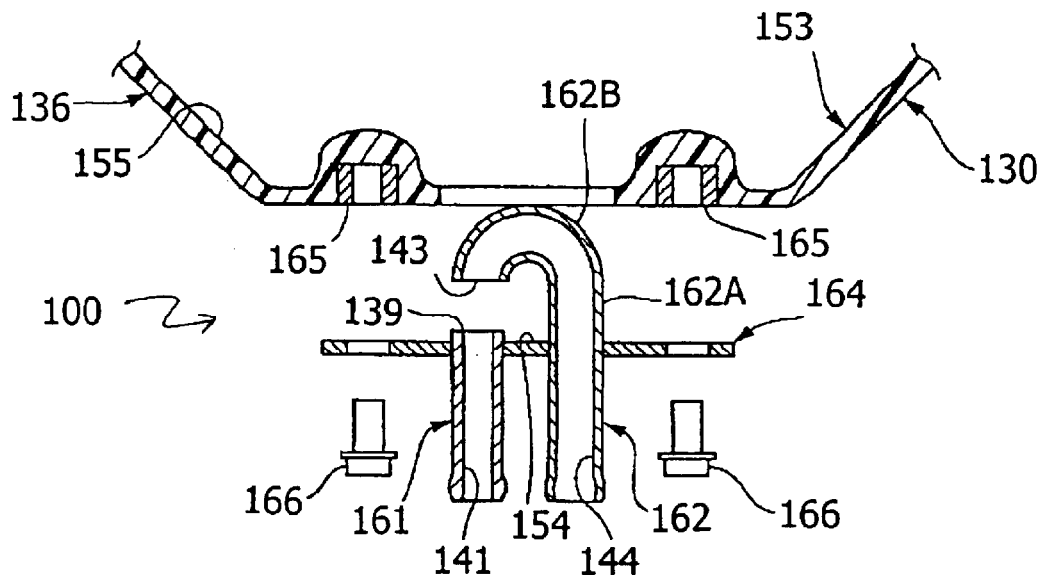
FIG. 4 is a partially enlarged sectional view of a portion of a fuel tank and fuel routing apparatus according to a second illustrative embodiment of the invention.

For instance, in a modified alternative embodiment of the invention, it is possible to connect the inlet and return pipes 161, 162 together with a plate-shaped member 164 to form a separate fuel routing apparatus 100, as shown in FIG. 4. The fuel routing apparatus of FIG. 4 is usable to form the bottom part 154 of a modified concave bowl portion 153 of the fuel tank body 136. In this second embodiment of the invention, the plate-shaped member 164 is made separate from the fuel tank body 136, and the fuel feed pipe 161 and the fuel return pipe 162, respectively define the fuel feed passage 141 and the fuel return passage 144 therein. The plate-shaped member 164, in this embodiment, is sealably fit to the fuel tank body 136.

In other words, the fuel feed line 141 and the fuel return line 144 form part of the fuel routing apparatus 100, which may be fixed to the fuel tank body 136 via the plate-shaped member 164. In this way, the arrangement of the fuel feed line 41 and the fuel return line 44 in the fuel tank body 36 is facilitated, and access to the fuel pipes for service and replacement is facilitated. In addition, in this case an embedded nut 165 is disposed in the fuel tank body 136 in advance, and the plate-shaped member 164 of the apparatus 100 is fitted to the fuel tank body 136 with a bolt 166 screwed into this embedded nut 165.

Figure 5:
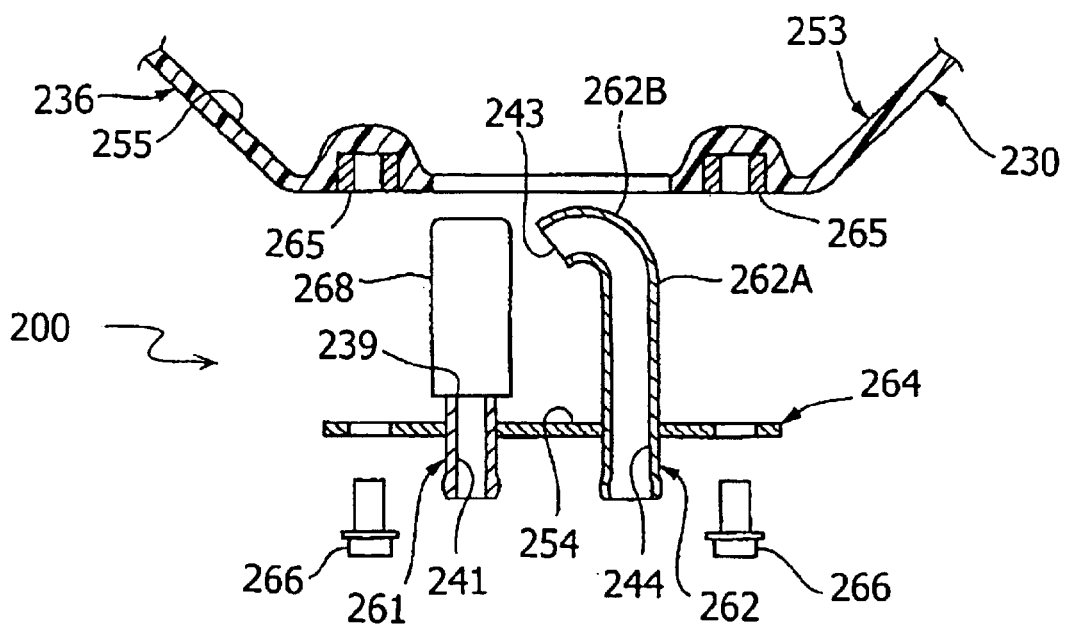
FIG. 5 is a partially enlarged sectional view of a portion of a fuel tank and fuel routing apparatus according to a third illustrative embodiment of the invention.

In another alternative embodiment of the invention, as shown in FIG. 5, a modified version of a fuel routing apparatus 200 may be provided, in which a fuel filter 268 may be integrally fitted to the pickup inlet 239 of the fuel feed pipe 261, to filter fuel entering the fuel feed passage 241 from the fuel tank body 236. In this embodiment, as, shown in FIG. 5, the filter 268 may be installed in advance on the plate-shaped member 264, together with the fuel feed pipe 261 and the fuel return pipe 262.

The plate-shaped member 264, in this embodiment, may be used to attach the fuel routing apparatus 200 to the fuel tank body 236. Further in this case, if the return port 243 is directed toward the pickup inlet 239, these elements may be shifted in position, apart or together, in the horizontal direction as shown in FIG. 5, but the return port 243 may, alternatively, be directed opposite the pickup inlet 239 in the perpendicular vertical direction, in the same way as described above in connection with the first embodiment.

While a limited number of illustrative embodiments of the present invention has been described, the present invention is not limited to the embodiments described above, but can be modified in various manners without departing from the spirit and scope of the present invention as set forth in the claims.

Having thus described the invention, what is claimed is:

1. A fuel tank for a vehicle having a fuel injection system, said fuel tank comprising:

a fuel tank body;

a fuel feed pipe operatively attached to the fuel tank body, said fuel feed pipe having a pickup inlet opening into the fuel tank body for supplying fuel flow therethrough for said fuel injection system; and a fuel return pipe operatively attached to said fuel tank body and having a return port opening inside said fuel tank body for returning unused fuel from said fuel injection system to said fuel tank body, the return port of said fuel return pipe is directed toward said inlet of said fuel feed pipe, wherein said pickup inlet of said fuel feed pipe and said return port of said fuel return pipe are each respectively situated adjacent the bottom part of said fuel tank body, and an upper surface of said fuel return pipe, after rising from said bottom part, bends convexly upward, with said return port oriented facing toward said inlet.

2. The fuel tank according to claim 1, wherein said fuel feed pipe and said fuel return pipe are disposed on a common plate-shaped member and fixed to said fuel tank body via the plate-shaped member.

3. A fuel tank for a vehicle having a fuel injection system, said fuel tank comprising:

a fuel tank body;

a fuel feed pipe operatively attached to the fuel tank body, said fuel feed pipe having a pickup inlet opening into the fuel tank body for supplying fuel flow therethrough for said fuel injection system; and a fuel return pipe operatively attached to said fuel tank body and having a return port opening inside said fuel tank body for returning unused fuel from said fuel injection system to said fuel tank body, the return port of said fuel return pipe is directed toward said inlet of said fuel feed pipe, wherein said pickup inlet of said fuel feed pipe is situated proximate the bottom part of said fuel tank body, and wherein said fuel return pipe extends through the bottom part of said fuel tank body, and is formed substantially in an inverted J-shape with said return port directed toward said inlet.

4. The fuel tank according to claim 1, characterized in that said inlet of said fuel feed pipe is integrally provided with a filter.

5. The fuel tank according to claim 1, characterized in that said fuel tank is adapted to be installed on a saddle-riding type four-wheeled vehicle.

6. The fuel tank according to claim 1, characterized in that said fuel feed pipe and said fuel return pipe are disposed on a common plate-shaped member and fixed to said fuel tank body via the plate-shaped member.

7. The fuel tank according to claim 3, characterized in that said inlet of said fuel feed pipe has a filter attached thereto.

8. A fuel tank for a vehicle having a fuel injection system, comprising:

a fuel tank body;

a fuel feed pipe operatively attached to said fuel tank body and having an inlet opening formed therein, said inlet opening oriented facing into the fuel tank body for supplying fuel therethrough to a fuel pump of a fuel injection system;

said inlet opening being situated proximate an interior surface of the bottom of the fuel tank body; and a fuel return pipe operatively attached to said fuel tank body and terminating in a return port opening into said fuel tank body for returning unused fuel from said fuel injection system into said fuel tank body through said return port;

wherein said return port being elevated above an interior surface of the bottom of the fuel tank body, said fuel return pipe being configured to direct fuel into the fuel tank body along a non-linear path, the return port is oriented facing toward the inlet opening of the fuel feed pipe, and the return port overlies the inlet opening such that the inlet opening and the return port are opposed.

9. The fuel tank of claim 8, wherein the return port has a diameter that is greater than the diameter of the inlet opening.

10. The fuel tank of claim 8, wherein the fuel feed pipe and the fuel return pipe are secured to a plate member, and wherein the plate member is detachably secured to the bottom of the fuel tank.

11. The fuel tank of claim 8, wherein the inlet opening is provided with a fuel filter thereon.

12. The fuel tank of claim 8, wherein a top portion of the fuel return pipe is curved in a direction to direct returned fuel outwardly from the return port and toward the inlet opening of the fuel feed pipe.

13. The fuel tank of claim 8, wherein the fuel return pipe is formed substantially in an inverted J-shape.

14. A fuel routing apparatus for a vehicle, comprising:

a plate for attaching to a fuel tank body;

a fuel feed pipe attached to the plate and defining an inlet opening; and a return pipe extending through the plate and having an inner end adapted to be disposed inside the tank body, wherein the inner end of the return pipe is non-linear in shape and terminates in a return port which is directed toward the inlet opening of the pickup pipe, wherein the return port of the return pipe is disposed opposite and oriented facing toward the inlet opening of the fuel feed pipe.

15. The fuel routing apparatus of claim 14, wherein the return port has a diameter that is greater than the diameter of the inlet opening.

16. The fuel routing apparatus of claim 14, wherein the inlet opening is provided with a fuel filter thereon.

17. The fuel tank of claim 14, wherein a top portion of the fuel return pipe is curved in a direction to direct returned fuel toward the inlet opening of the fuel feed pipe.

18. The fuel tank of claim 14, wherein the fuel return pipe is formed substantially in an inverted J-shape.

* * * * *